May 25, 1937.     B. H. ANIBAL     2,081,214
ARTICULATED PROPELLER SHAFT
Filed Sept. 24, 1936
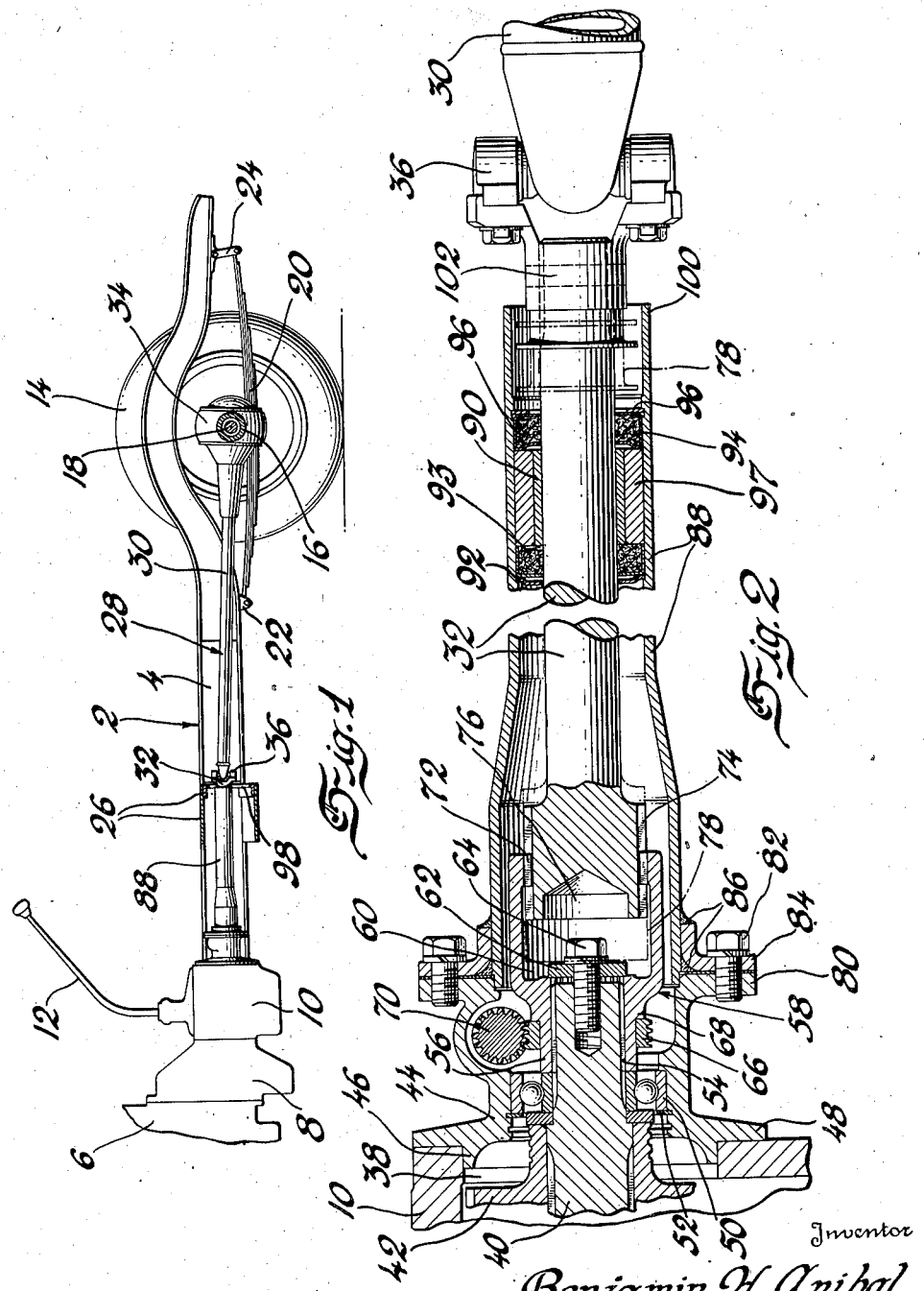
Inventor
Benjamin H. Anibal
By Blackmore, Sweent & Flint
Attorneys Patented May 25, 1937

2,081,214

UNITED STATES PATENT OFFICE 2,081,214

ARTICULATED PROPELLER SHAFT

Benjamin H. Anibal, Pontiac, Mich., assignor to General Motors Corporation, Detroit, Mich., a corporation of Delaware Application September 24, 1936, Serial No. 102,322

8 Claims. (Cl. 180—70)

This invention relates to automotive vehicles and has particular reference to the mounting and installation of the drive or propeller shaft which connects the transmission to the rear axle.

Owing to the fact that the tendency in modern automotive practice is to lower the frame and body nearer the ground, it has been found that the straight one-piece propeller shaft between the transmission and rear axle came so close to the floor of the vehicle that it was necessary to provide a tunnel along the center line of the body floor to accommodate the up and down movements of the propeller shaft due to the flexing of the rear springs. To avoid placing a tunnel in the body floor and thereby obtaining a flat floor the propeller shaft has been provided with a universal joint intermediate its ends so that the shaft could be given a position farther away from the floor of the vehicle and also avoid the middle part of the shaft coming up in contact with the body floor.

In order to obtain a smoother operation of the drive shaft, experiment disclosed that if the forward section of the propeller shaft were mounted in a rather long housing which extended from the rear of the transmission to the universal joint, that a smoother operation would be obtained by leaving the rear end of the housing free and unsupported. In order not to interfere with the operation of the propeller shaft due to the up and down movement of the rear axle, a splined connection was provided immediately to the rear of the transmission between the propeller shaft and a propeller shaft coupling inside the housing.

On the drawing

Figure 1 shows a side view of so much of an automotive vehicle as is necessary to illustrate the invention.

Figure 2 is a longitudinal sectional view through the front section of the propeller shaft and a portion of the transmission to show the invention.

On the drawing the vehicle as a whole is indicated at 2. The vehicle has the usual frame 4 in which there is mounted the engine 6 having connected thereto the clutch housing 8 and transmission housing 10. The transmission is operated by the usual lever 12. The rear wheels are indicated at 14 and are mounted on the rear axle housing 16 and driven from the live axle 18 rotatably mounted in the housing 16. The rear axle housing 16 is mounted on the springs 20 connected by the bracket 22 and the shackle 24 to the frame 4. The frame is provided with suitable transverse members 26 to add strength thereto.

The propeller shaft of the invention is indicated as a whole at 28 and comprises the rear section 30 and the forward section 32. The end of the rear section 30 is connected to the live axle 18, with the usual differential enclosed in the housing 34. The front end of the rear section 30 is connected to the front section by the universal joint 36.

Referring to Figure 2, the transmission 10 has an opening 38 at its rear end to allow the transmission shaft 40 to project from the transmission. One of the gears of the transmission is indicated at 42. Exteriorly of the transmission a rear bearing retainer or short housing 44 is fitted into the opening 38 by means of the flange 46. The housing 44 has the external flange 48 fitting against the outside of the transmission housing and is secured to the transmission housing by means of suitable machine bolts (not shown).

Inside the housing 44 the ball bearing 50 is mounted and held in place by the retainer 52. This bearing receives the shaft 40 which projects beyond the bearing and is splined as at 54 to receive the splined end 56 of the propeller shaft coupling 58. The coupling 58 projects beyond the end of the shaft 40 and is hollow as indicated at 60. The coupling 58 is held onto the shaft 40 by means of the retainer 62 and the machine bolt 64 which is screw threaded into a threaded opening in the end of the shaft 40.

A worm wheel 66 is rigidly secured on the coupling 58 and abuts against a shoulder 68 thereon. The worm wheel 66 meshes with the worm 70, suitably mounted in bearings in the housing 44. The usual speedometer of the vehicle is driven from the end of the worm 70 which projects beyond the housing 44.

The end of the propeller shaft coupling 58 is provided with internal teeth 72 at its end which mesh with corresponding teeth 74 on the forwardmost end of the forward section 32 of the propeller shaft. The end of the section 32 is hollow as indicated at 76 to allow the retainer 62 and the head of the nut 64 to be received therein. The connection between the teeth 72 and 74 is not a rigid one, but movement is allowed. When the rear axle 16 moves up and down in response to spring flexures the shaft 28 will be pushed forward due to the fact that the shaft sections 30 and 32 tend to align with each other. The extreme forward movement of the shaft end is indicated by the dotted outline position 78 in Figure 2.

The rear end of the housing 44 has the rear flange 80 formed integral therewith. To the rear flange 80 there is secured by means of the machine bolts 82 the ring flange 84 which in turn is welded as at 86 to the enlarged end of a housing 88 which projects rearwardly from the housing 44 and ends a little short of the universal joint 36. The propeller shaft section 32 is received inside the housing and at the rear housing end the shaft is mounted in the bearing 90 held in place by the retaining ring 92 and packing 93 at the forward end, and the packing 94 at the rear end. The bearing 90 may be a plain or a roller bearing. The packing 94 in turn is held in position by means of the retainers 96. The packing 94 closely embraces the shaft 32 and prevents the entrance of foreign matter and escape of oil. The bearing 90 is supported by the backing collar 97.

Referring to Figure 1, it will be noted that the propeller shaft 28 and the housing 88 pass through an opening 98 in the transverse member 26 of the frame. The rear end 100 of the housing 88 is freely disposed or unsupported. In other words, the only support for the housing 88 is at the front end where it is connected by means of the bolts 82 and flange 84 to the flange 80. The rear end of the shaft section 32 is rigidly and permanently connected at 102 to the universal joint 36.

By mounting the shaft section 32 in the housing 88 unsupported at its rear end, the transmission of torque to the universal joint 36 through the semiflexible coupling at 72 and 74 allows for minute deflections of the supporting housing. The rear propeller shaft section 30 is provided without a slip joint and in the particular design has not support on the frame. This has proved to be exceptionally well fitted for production in which the propeller shaft is positioned low enough to enable the vehicle to have a straight floor and to eliminate the usual center tunnel. Due to the absence of any support to the frame for the rear end of the housing 88 a much smoother transmission of power to the rear axle is obtained and the body of the car is freed from annoying vibrations. The smoothness was lacking in the former two-section designed propeller shafts in which a support was provided on the frame for the rear end and the front section of the propeller shaft.

I claim:

1. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a supporting housing secured at one of its ends to the transmission housing, its other end being free and unsupported, said shaft passing through said housing, and means in the free end of the housing to support the shaft.

2. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a supporting housing secured at one of its ends to the transmission housing, its other end being free and unsupported, said shaft passing through said housing, and a bearing in the free end of the housing to support the drive shaft.

3. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a rear bearing retainer secured to the transmission, a supporting housing secured to said retainer at one end and freely disposed and unsupported at its other end, said shaft passing through said housing, and means in the free end of the housing to support the shaft.

4. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a rear bearing retainer secured to the transmission, a supporting housing secured to said retainer at one end and freely disposed and unsupported at its other end, said shaft passing through said housing, and a bearing in the free end of the housing to support the drive shaft.

5. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a long supporting housing secured at one of its ends to the transmission housing, its other end being free and unsupported and extending substantially to the universal joint in the shaft, said shaft passing through said housing, and means in the free end of the housing to support the shaft.

6. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a long supporting housing secured at one of its ends to the transmission housing, its other end being free and unsupported and extending substantially to the universal joint in the shaft, said shaft passing through said housing, and a bearing in the free end of the housing to support the drive shaft.

7. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a supporting housing secured at one of its ends to the transmission housing, its other end being free and unsupported, said shaft passing through said housing, means in the free end of the housing to support the shaft, and means to seal the free end of the housing.

8. In an automotive vehicle having a rear axle, an engine and a transmission connected to the engine, a drive shaft from the transmission to the rear axle to transmit the power of the engine, a universal joint in said shaft intermediate its ends, a slidable splined connection between the shaft and the transmission, a supporting housing secured at one of its ends to the transmission housing, its other end being free and unsupported, said shaft passing through said housing, a bearing in the free end of the housing to support the drive shaft, and means to seal the free end of the housing.

BENJAMIN H. ANIBAL.